(12) United States Patent
Al Moyaibed et al.

(10) Patent No.: US 11,692,805 B2
(45) Date of Patent: Jul. 4, 2023

(54) IDENTIFICATION SYSTEM FOR TUBULARS (71) Applicant: SAUDI ARABIAN OIL COMPANY, Dhahran (SA)

(72) Inventors: Jasem Mohammed Al Moyaibed, Tarut (SA); Zakaria Ibrahim Albu, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 120 days.

(21) Appl. No.: 17/411,409

(22) Filed: Aug. 25, 2021

(65) Prior Publication Data
US 2023/0066920 A1 Mar. 2, 2023

(51) Int. Cl.
G01B 5/12 (2006.01)

(52) U.S. Cl.
CPC ..................... *G01B 5/12* (2013.01)

(58) Field of Classification Search
CPC ........................................ G01B 5/12
USPC .......................... 33/542, 543, 546
See application file for complete search history.

(56) References Cited

U.S. PATENT DOCUMENTS

| | | | | |
|---|---|---|---|---|
| 4,481,816 A | * | 11/1984 | Prentice | G01B 5/12 33/544.2 |
| 4,573,131 A | * | 2/1986 | Corbin | G01B 7/34 73/105 |
| 4,821,425 A | | 4/1989 | Currie et al. | |
| 5,182,862 A | * | 2/1993 | Frank | G01B 5/204 33/829 |
| 5,852,642 A | * | 12/1998 | Descot | G01B 7/345 33/502 |
| 6,079,113 A | * | 6/2000 | Helmrichs | G01B 7/293 33/708 |

(Continued)

FOREIGN PATENT DOCUMENTS

| | | |
|---|---|---|
| CN | 105740746 B | 8/2020 |
| EP | 0 784 196 A2 | 7/1997 |

(Continued)

OTHER PUBLICATIONS

Novacam, "TUBEINSPECT system for high-precision tube ID and OD metrology"; TUBEINSPECT: Tube ID & OD High-Precision 3D Measurements; <https://www.novacam.com/products/tubeinspect-for-3d-tube-id-and-od-metrology/>; Accessed Apr. 26, 2021 (20 pages).

*Primary Examiner* — George B Bennett
(74) *Attorney, Agent, or Firm* — Osha Bergman Watanabe & Burton LLP (57) ABSTRACT

A method is disclosed that includes measuring an inner diameter (ID) of a tubular at least at a plurality of points along an inner circumference of the tubular, at a predetermined axial distance from an end of the tubular, to yield a first set of measurements. A computer processor is used to: create a tubular profile from the first set of measurements, wherein the tubular profile represents a unique identification code of the tubular; save the profile; and thereafter identify the tubular. The tubular is identified via: receiving a second set of measurements of the ID of the tubular from at least at a plurality of points along an inner circumference of the tubular, at the predetermined axial distance from the end of the tubular; and comparing the second set of measurements with the saved tubular profile to identify the tubular.

20 Claims, 5 Drawing Sheets

(56) References Cited

U.S. PATENT DOCUMENTS

| | | | |
|---|---|---|---|
| 6,272,762 B1* | 8/2001 | Kinast | G01B 5/213 |
| | | | 33/550 |
| 6,430,832 B1* | 8/2002 | Dall'Aglio | B24B 5/42 |
| | | | 33/555.1 |
| 7,421,914 B2* | 9/2008 | Stanley | G01B 5/12 |
| | | | 33/544.3 |
| 7,765,710 B2* | 8/2010 | Tsai | G01B 5/12 |
| | | | 33/784 |
| 8,237,935 B2 | 8/2012 | Nygaard et al. | |
| 8,763,895 B2 | 7/2014 | Colman et al. | |
| 9,038,283 B2* | 5/2015 | Luty | G01B 5/12 |
| | | | 33/544.5 |
| 2009/0144999 A1* | 6/2009 | Lau | G01B 5/20 |
| | | | 33/544.1 |
| 2012/0091197 A1 | 4/2012 | Castrec et al. | |
| 2014/0092234 A1 | 4/2014 | Thomas et al. | |

FOREIGN PATENT DOCUMENTS

| | | |
|---|---|---|
| FR | 2 985 306 A1 | 7/2013 |
| JP | S52-151047 A | 12/1977 |
| JP | 3028058 B2 | 4/2000 |
| WO | 2017/045051 A1 | 3/2017 |

\* cited by examiner

IDENTIFICATION SYSTEM FOR TUBULARS

BACKGROUND

In the oilfield and other industries, identifying and tracking sections of tube, or of tubular products (also referred to herein as "tubulars"), can be of critical importance in locating such products through processes which may involve loading, shipping, delivery and assembly. For instance, a large number of such tubulars may be delivered to a well site, to be engaged with one another via threads to form a significantly long pipe or casing to be disposed in a wellbore, and for a variety of reasons the identification and tracking of individual tubulars becomes all the more helpful.

Conventional identification protocols typically involve marking, painting or stenciling a visual code (e.g., a set of alphanumeric characters) at the outer surface of a tubular. However, this becomes greatly unreliable in view of typical physical disruptions (e.g., weathering or other general wear-and-tear) which may be encountered during shipment, delivery, and/or even lengthy periods of storage (at any location).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein related to a method that includes measuring an inner diameter (ID) of a tubular at least at a plurality of points along an inner circumference of the tubular, at a predetermined axial distance from an end of the tubular, to yield a first set of measurements. A computer processor is used to: create a tubular profile from the first set of measurements, wherein the tubular profile represents a unique identification code of the tubular; save the profile; and thereafter identify the tubular. The tubular is identified via: receiving a second set of measurements of the ID of the tubular from at least at a plurality of points along an inner circumference of the tubular, at the predetermined axial distance from the end of the tubular; and comparing the second set of measurements with the saved tubular profile to identify the tubular.

In one aspect, embodiments disclosed herein relate to a system for identifying a tubular. The system includes a first measurement tool configured to measure an inner diameter (ID) of a tubular at least at a plurality of points along an inner circumference of the tubular, at a predetermined axial distance from an end of the tubular, to yield a first set of measurements. The system further includes one or more hardware processors in communication with the first measurement tool and configured to: create a tubular profile from the first set of measurements, wherein the tubular profile represents a unique identification code of the tubular; save the tubular profile; and thereafter identify the tubular. The tubular is identified via: receiving a second set of measurements of the ID of the tubular from at least at a plurality of points along an inner circumference of the tubular, at the predetermined axial distance from the end of the tubular; and comparing the second set of measurements with the first set of measurements in the saved tubular profile to identify the tubular.

In one aspect, embodiments disclosed herein related to a non-transitory computer readable medium storing instructions executable by a computer processor, the instructions comprising functionality for: receiving a first set of measurements of an inner diameter (ID) of a tubular from at least at a plurality of points along an inner circumference of the tubular, at a predetermined axial distance from an end of the tubular; creating a tubular profile from the first set of measurements, wherein the tubular profile represents a unique identification code of the tubular; saving the tubular profile; and thereafter identifying the tubular. The tubular is identified via: receiving a second set of measurements of the ID of the tubular from at least at a plurality of points along an inner circumference of the tubular, at the predetermined axial distance from the end of the tubular; and comparing the second set of measurements with the saved tubular profile to identify the tubular.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Turning now to the figures, it should be noted that the flowchart and block diagrams therein illustrate the architecture, functionality, and operation of possible implementations of systems, apparatuses, methods and computer program products according to one or more embodiments. In this regard, each block in the flowchart or block diagrams may represent a segment, module, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Additionally, any block shown in a flowchart and/or block diagram may in instances be regarded as individually dispensable or interchangeable, thus not necessarily dependent on being included with one or more other blocks shown in the same diagram. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

To facilitate easier reference when describing FIGS. 1 through 6, reference numerals may be advanced by a multiple of 100 in indicating a similar or analogous component or element among FIGS. 1-6.

As broadly contemplated herein, one or more embodiments generally relate to a process for generating a unique identification code for tubular products (or "tubulars") by measuring variances in internal diameter for each tubular product. This may be accomplished by taking measurements of a tubular inner diameter (herein abbreviated as "ID", not to be confused with "identification") at one or more predetermined locations within each tubular using a depth measurement tool, and generating a physical profile or "signature" of the tubular that is based on the ID measurements and is tied into physical variances in tubular manufacturing.

Figure 1:
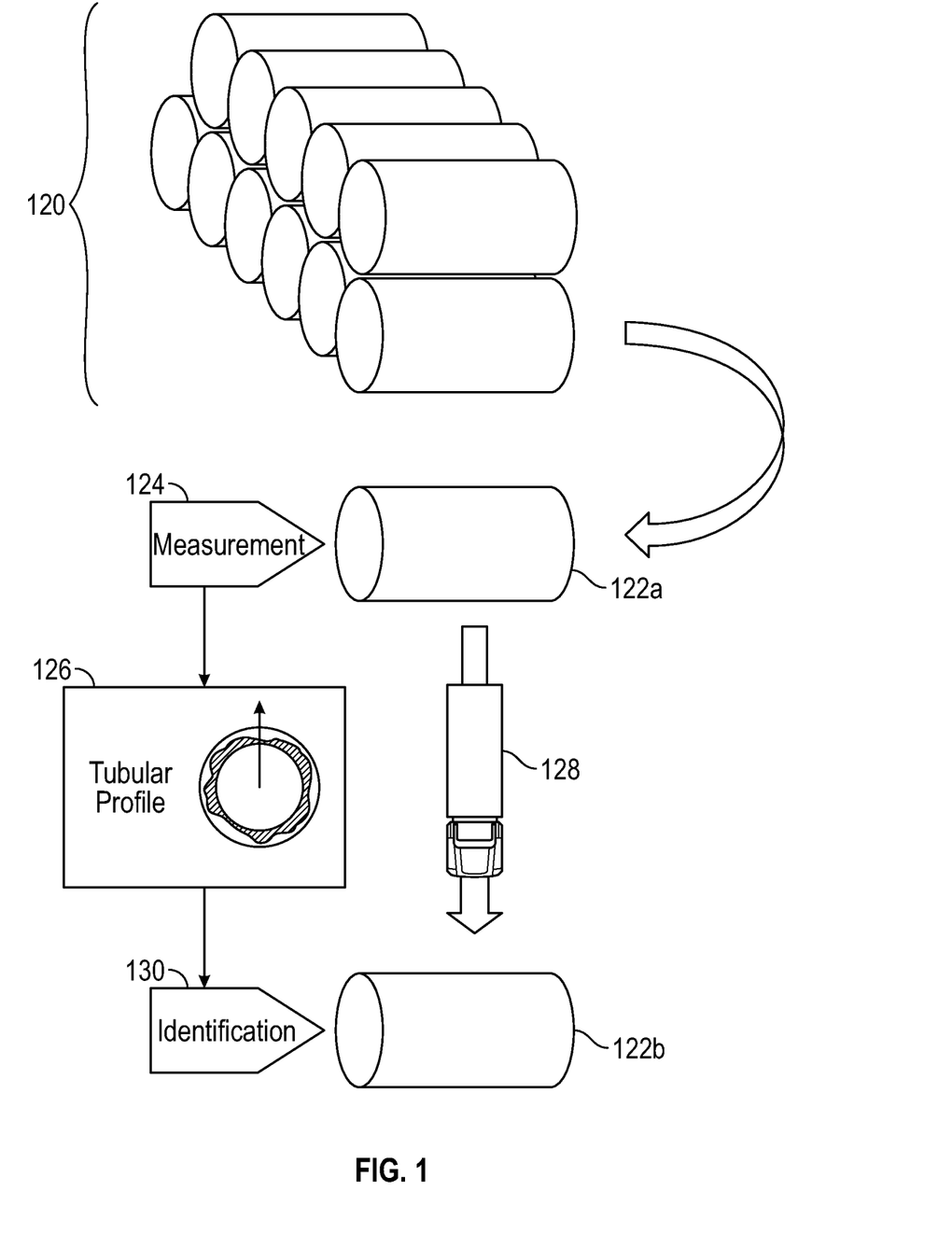
FIG. 1 schematically illustrates a store of tubulars along with stages of delivering and identifying an individual tubular in accordance with one or more embodiments.

In accordance with one or more embodiments, FIG. 1 schematically illustrates a store 120 of tubulars, along with stages of delivering and identifying an individual tubular. As such, the store of tubulars 120 may be disposed (by way of example) at a first location such as a manufacturing or warehousing site. From among dozens or even hundreds or more of such tubulars 120, an individual tubular 122a may be slated for delivery to a second location (e.g., a well site or construction site), possibly along with a large number of other tubulars. Accordingly, in a manner to be better appreciated herebelow, one or more measurements (124) of the tubular 122a may be taken in a manner to assist in its subsequent identification. By way of illustrative example, and in a manner discussed in greater detail herebelow, an ID of the tubular 122a may be measured at least at a plurality of points along an inner circumference thereof, at a predetermined axial distance from the end of the tubular 122a.

In accordance with one or more embodiments, a tubular profile (126) may be created and stored/saved from this first set of measurements. The tubular profile may be in the form of a data structure having a set of numbers based on the measurements or may involve a graphical representation, a rough example of which is shown at 126 in FIG. 1 (and will be better understood herebelow). The tubular profile, indeed, can be understood as displaying or tracking minute physical variances from manufacturing along the inner circumference of the tubular 122a at the aforementioned axial distance, and is unique to that tubular 122a (i.e., the tubular profile for a particular tubular 122a is not duplicated in any other tubular beyond an infinitesimally small chance of the same that is extremely unlikely to occur in practice). Thus, the tubular profile of a particular tubular is a unique identification code for the associated tubular.

By way of an illustrative working example, in accordance with one or more embodiments, for a tubular (e.g., for a casing) with an overall outer diameter ("OD") of 13⅜", thicknesses (i.e., differences between OD and ID) may vary along the inner circumference of the tubular between a low of 1.03 inches and high of 1.31 inches. In such an illustrative working example, the OD and ID each may vary, along the inner circumference of the tubular, within a range of variability of about 0.17 inch or up to a range of variability of about 0.28 inch. Thus while these ranges of variability may appear to be of a small scale, it should still be appreciated that within those ranges a very wide range of unique tubular profiles can still be generated, that will easily be distinguishable when compared with one or more other tubular profiles.

The tubular 122a itself may, in accordance with one or more embodiments, be delivered to the second location (e.g., via suitable transport such as a truck 128). At the second location, the delivered tubular (here indicated at 122b) may then be identified (130). By way of illustrative example, and in a manner discussed in greater detail below, identification 130 may involve obtaining or receiving a second set of measurements of the ID of the tubular, from at least at a plurality of points along an inner circumference of the tubular, at the same predetermined axial distance from the end of the tubular. To complete identification (130), the second set of measurements may then be compared with the saved tubular profile (126) for that particular tubular 122a. In an example embodiment, the second set of measurements may be taken from the same plurality of points as the first set of measurements. Thus, if (as discussed herein) the first set of measurements is taken along a full inner circumference of the tubular, continuously or periodically, the second set of measurements may be taken in the same manner. However, in accordance with a variant embodiment, the second set of measurements may be taken from a plurality of points that differ, in full or in part, from the plurality of points from which the first set of measurements are taken.

Figure 6:
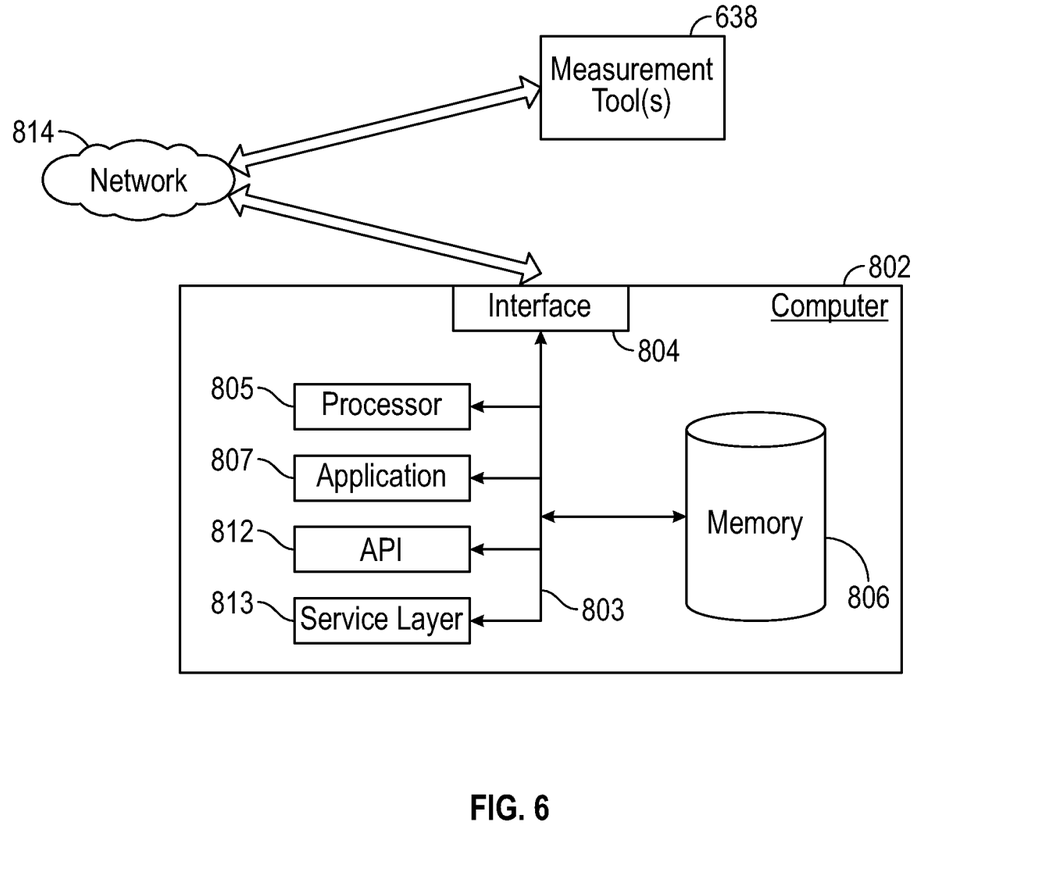
FIG. 6 schematically illustrates a computing device in accordance with one or more embodiments.

In accordance with one or more embodiments, it should be appreciated that when a tubular profile is created and saved (126), it may be stored in a dedicated database (e.g., in memory 806 at a computer 802 as shown in FIG. 6) for use in subsequent identification (130); this applies both to a numerical profile and a graphical profile alike. Additionally, as will also be appreciated herebelow, there are a great variety of possibilities for obtaining the aforementioned second set of measurements. For instance, such measurements may be obtained via essentially the same protocol as obtaining the first set of measurements (124), examples of which will be further appreciated herebelow.

Figure 2:
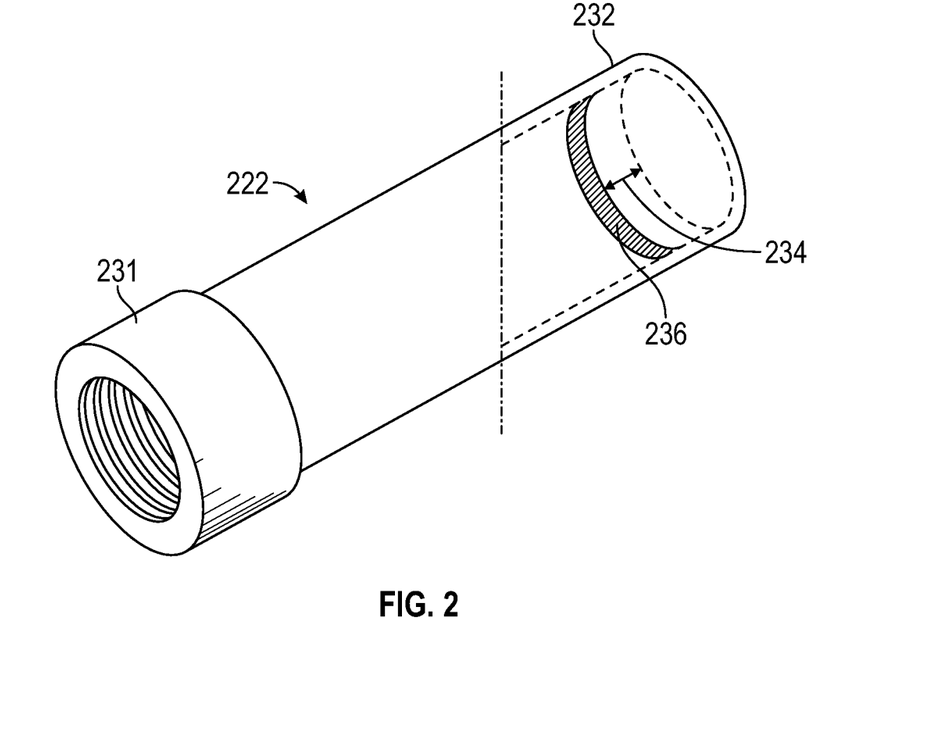
FIG. 2 provides an isometric elevational view of a tubular, in accordance with one or more embodiments.

FIG. 2 provides an isometric elevational view of a tubular 222, in accordance with one or more embodiments. By way of an illustrative working example, tubular 222 may include, at one end thereof, a collar 231 with internal threading, while the opposite end 232, without a collar, may be referred to as the "pin" end. The dimension indicated at 234 is a predetermined axial distance (from pin end 232) at which the ID of tubular 222 may be measured toward identifying the tubular 222. The corresponding inner circumference of the tubular 222, at the location defined by the axial distance 234, could be prepared in advance with a stripe 236 of protective varnish or other type of coating (e.g., paint or resin), in order to help ensure more reliable ID measurements (e.g., which may be taken in a manner as described in more detail herein).

In accordance with one or more embodiments, the axial distance 234 by and large may be chosen, e.g., to clear a given distance from the pin end 232 to help ensure reliable operation of a depth measurement tool as discussed herebelow. By way of an illustrative and non-restrictive example, e.g., for a tubular 222 (e.g., casing) with an outer diameter of 13⅜", the distance 234 could be between about 30 cm and about 50 cm. A dimension of such magnitude can help ensure greater stability for the depth measurement tool employed (thus, greater operational reliability), and to facilitate the possibility of a visual check into the tubular 222 (from pin end 232) that may be needed or warranted.

Figure 3A:
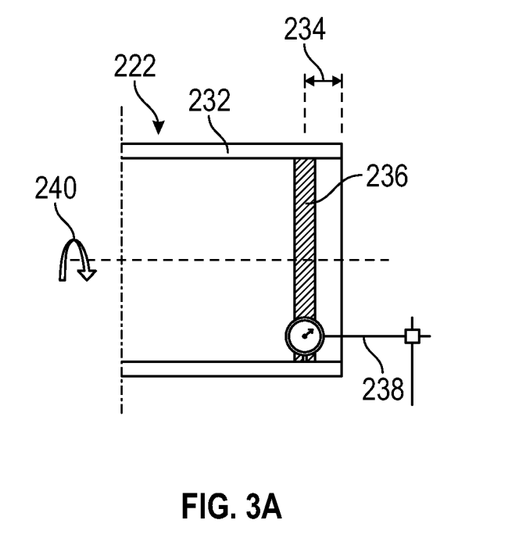
FIGS. 3A and 3B, respectively, provide elevational and isometric elevational views of the pin end of the tubular of FIG. 2, but with the addition of a depth measurement tool, in accordance with one or more embodiments.
Figure 3B:
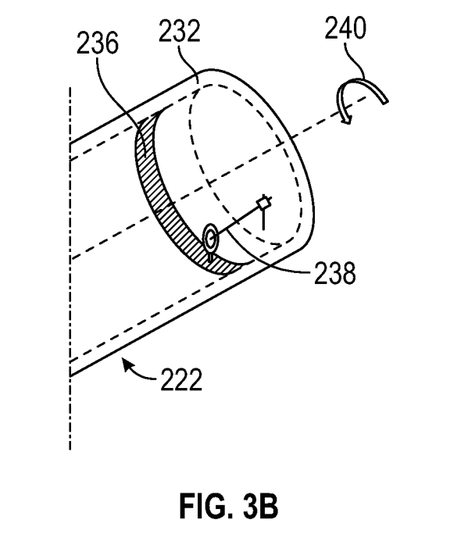

As such, FIGS. 3A and 3B respectively provide elevational and isometric elevational views of the pin end 232 of the tubular 222 of FIG. 2, but with the addition of a depth measurement tool 238 in accordance with one or more embodiments. Tool 238 may be a depth gauge instrument which is inserted into the pin end 232 (to the predetermined axial distance 234) to measure the ID of tubular 222 at least at a plurality of points along the inner circumference of the tubular 222, yielding a first set of measurements (as at 124 in FIG. 1). The tool may then take ID measurements of the tubular 222 as the latter is rotated (240) over 360 degrees (i.e., the full inner circumference of tubular 222). Such measurements could be continuous or periodic (e.g., with individual measurements taken at predetermined time intervals or angular measurements). In one or more variant embodiments, ID measurements may be taken along the inner circumference of tubular 222 but not over the full 360 degrees (e.g., over 90, 180 or 170 degrees). A great variety of commercially available depth gauge instruments, calibrated to accurately measure small variances of a scale contemplated herein, can readily be employed here. As an alternative to a conventional, mechanical depth gauge instrument, a caliper arm, gamma ray emitter or laser instrument may be used.

In accordance with one or more embodiments, a depth gauge instrument embodying tool 238 may constructed or disposed in a manner to facilitate accurate measuring at the predetermined axial distance 234, e.g., the gauge itself may be mounted on a rigid bracket. Further, if a depth gauge instrument indeed is used as tool 238, then raw measurements of a distance/depth to the inner wall of tubular 222, from a fixed position of the depth gauge, may be taken. Thus, values for actual tubular ID may then readily be calculated based on such measurements. Such calculations may be undertaken via internal logic in the tool 238 itself, or via a computer processor with which the tool 238 is directly or indirectly in communication, such as processor 805 of computer 802 shown in FIG. 6.

Figure 4A:
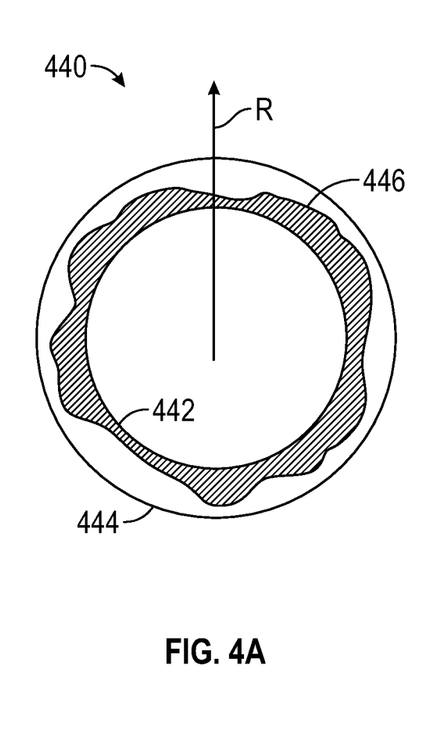
FIGS. 4A, 4B and 4C schematically illustrate examples of graphical profiles representing measurements of tubular inner diameter, in accordance with one or more embodiments.
Figure 4B:
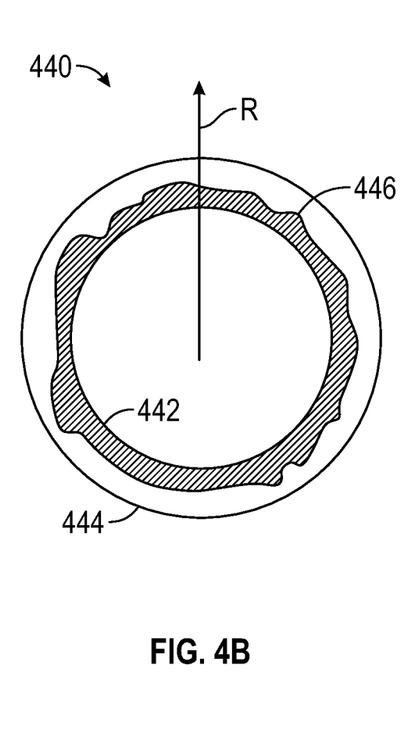
Figure 4C:
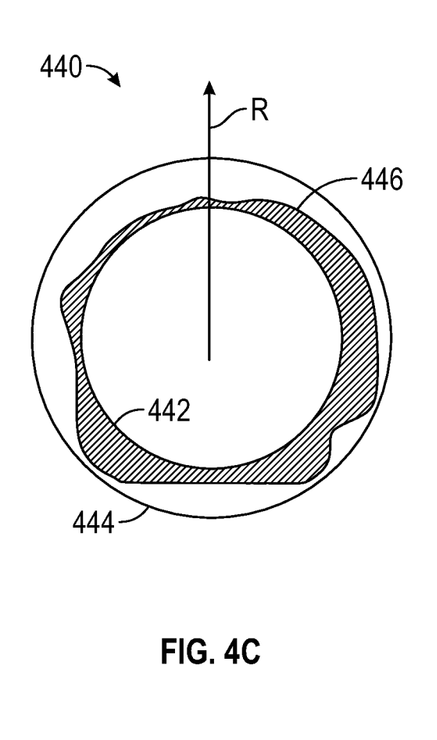

FIGS. 4A, 4B and 4C schematically illustrate examples of graphical tubular profiles 440 representing measurements of tubular ID, in accordance with one or more embodiments. Each profile 440 represents a created plot of ID measurements of a tubular (e.g., as taken in a manner discussed with respect to FIGS. 1-3B), wherein a reference point (shown here with the dotted arrow labelled "R") may indicate an initial angular position at which the measurements begin, and which can be used for comparison/identification purposes in one or more subsequent steps (e.g., in identification of a tubular as indicated at 130 in FIG. 1).

As such, in accordance with one or more embodiments, for each of the graphical profiles 440, the inner and outer concentric circles (442 and 444, respectively) represent benchmark minimum and maximum possible IDs for a measured tubular. Such benchmark minimum and maximum IDs may be preestablished for a large collection or cohort of tubulars of presumably similar dimensions and properties. As such, a varying solid area 446 between the circles 442 and 444 represents the actual ID measurements taken (wherein the actual measured ID values lie at the varying, radially outermost edge of the solid area). The resulting visual appearance or expression of each physical profile 440 may then constitute an identification "code" of its own accord. Further, any such profile 440 may be saved (e.g., in a dedicated database such as in memory 806 of computer 802 in FIG. 6), to then be used in identifying the corresponding tubular (e.g., as at 130 in FIG. 1).

In accordance with one or more variant embodiments, it is possible to use only one benchmark (e.g., minimum ID or maximum ID) against which to measure and/or plot measurements of tubular ID. Further, as noted heretofore, it is possible to create a profile which is numerical only, e.g., includes a data set including measurements of tubular ID, which may be compared with or plotted against at least one benchmark such as minimum ID and/or maximum ID.

In accordance with one or more embodiments, there are numerous possibilities for determining the aforementioned benchmark minima and maxima (represented by circles 442 and 444, respectively) for plotting the tubular ID measurements related to ID variance (e.g., via varying solid area 446). For instance, such minima and maxima could be set more or less arbitrarily, or could be established quantitatively based on known manufacturing tolerances for a particular collection, class or product line of tubulars to be measured. Thus, they could be understood as truly the lowest and highest possible IDs that are practically possible, against which actual variances in ID shown by an individual tubular could be plotted for reference purposes.

By way of illustrative example, in accordance with one or more embodiments, such dimensional tolerances may be known (e.g., published) with respect to tubular outer diameter ("OD") and thickness. For instance, API-5CT (American Petroleum Institute Specification 5CT), which is a governing standard for OCTG ("oil country tubular goods") products, currently defines dimensional tolerances for tubular OD and thickness but not for tubular ID. Accordingly, assuming that minimum and maximum tolerances for tubular OD and thickness are known, then the benchmark minimum and maximum for tubular ID, for the aforementioned plotting purposes, could be determined as follows:

$$ID(Min)=OD(Min)-2\times Thickness(Max)$$

$$ID(Max)=OD(Max)-2\times Thickness(Min), \text{ where:}$$

ID (Min) and ID (Max) are the calculated benchmark minimum and maximum, respectively, for a tubular to be measured/plotted;

OD (Min) and OD (Max) are the minimum and maximum tubular OD values based on published or pre-established tolerances; and Thickness (Min) and Thickness (Max) are the are the minimum and maximum tubular thickness values based on published or pre-established tolerances.

Figure 5:
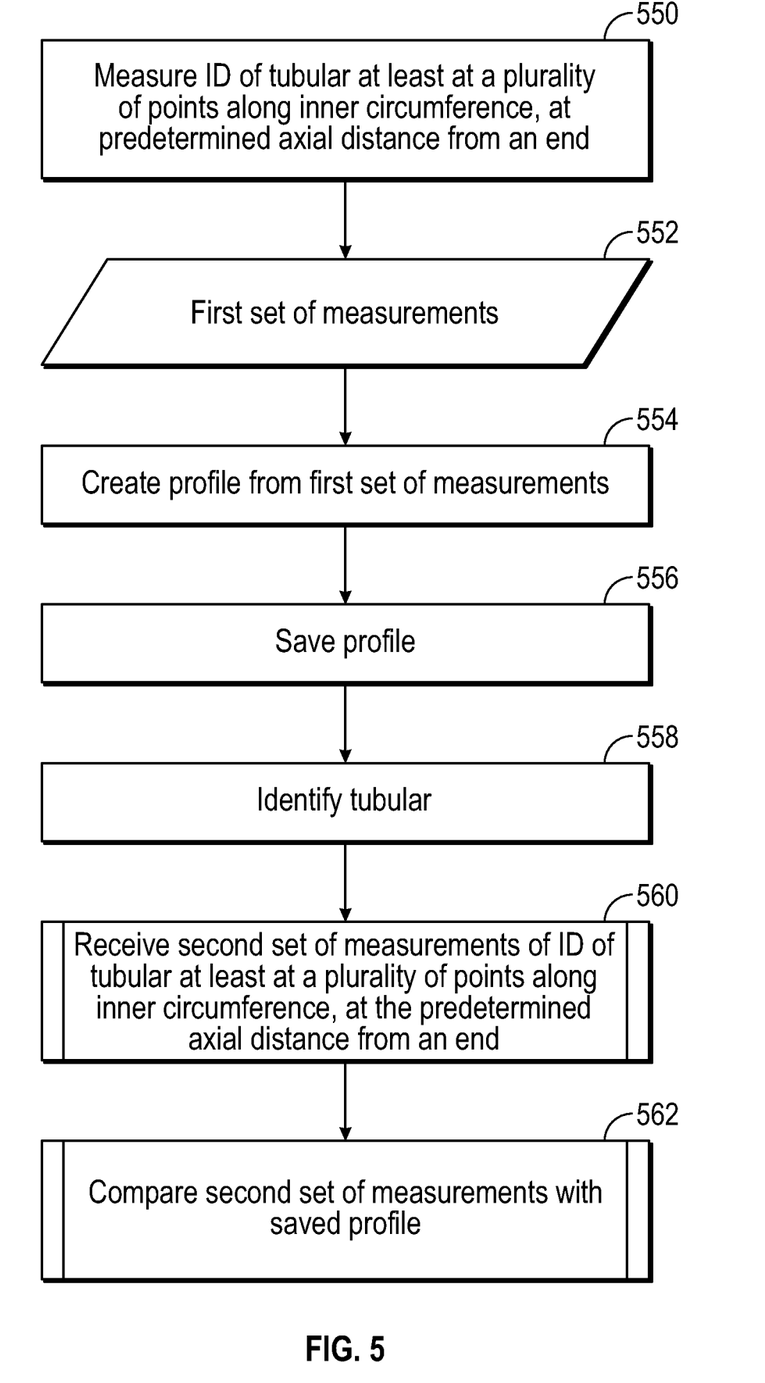
FIG. 5 shows a flowchart depicting a process of identifying a tubular, in accordance with one or more embodiments.

FIG. 5 shows a flowchart depicting a process of identifying a tubular, in accordance with one or more embodiments. As shown, an ID of a tubular may be measured at least at a plurality of points along an inner circumference of the tubular, at a predetermined axial distance from an end of the tubular (Step 550), to yield a first set of measurements (Step 552). By way of merely illustrative example, this may be carried out in a manner similar to that described and illustrated with respect to tubulars 122a and 222 in FIGS. 1-3B. A tubular profile may then be created from the first set of measurements (Step 554) and saved (Step 556). As a merely illustrative example, this may be carried out as shown in FIG. 1 (at 126), and may result in profiles such as those indicated at 440 in FIGS. 4A-4C. The tubular may then be identified (Step 558) via receiving a second set of measurements of the ID of the tubular from at least at a plurality of points along an inner circumference of the tubular, at the predetermined axial distance from the end of the tubular (560), and comparing the second set of measurements with the saved profile (Step 562). It should be appreciated that steps 554 through 562 may be carried out via suitable logic in a computer processor, such as the processor 805 of computer 802 described and illustrated with respect to FIG. 6.

As an illustrative example, in accordance with one or more embodiments, identification (558) may take place in a manner such as that described and illustrated with respect to FIG. 1 (particularly, at 130). Creating a profile (Step 554) may then be understood as creating a first graphical profile. Further, by way of illustrative and non-restrictive example, the second set of measurements may be taken similarly to the first set of measurements, e.g., via measuring the ID of the tubular at least at a plurality of points along an inner circumference of the tubular, at the predetermined axial distance from an end of the tubular (e.g., in a manner similar to that described and illustrated with respect to tubulars 122a and 222 in FIGS. 1-3B). This may be carried out by essentially the same measurement tool as used for the first set of measurements, e.g., such as tool 238 in FIGS. 3A and 3B, or via a different suitable measurement tool at the second location of the tubular. At that stage, a second graphical profile may be created from the second set of measurements, e.g., similar to the profiles 440 shown in FIGS. 4A-4C. The step of comparing (562) may then involve comparing the first graphical profile with the second graphical profile.

In accordance with one or more embodiments, essentially any suitable algorithm may be employed for comparing the first and second graphical profiles (Step 562) to determine whether there is an adequate match between the two. For instance, if a match is to be found from a store of a large number of graphical profiles (e.g., in memory 806 of a computer 802 such as that shown in FIG. 6) an iterative process could be employed (e.g., via a processor 805 in the same computer 802) to filter out unsuitable candidates for a match via two or more steps where criteria for a match are narrowed at each step. Thus, in a first step of such an iterative process, a broad filter could be applied where a relatively small portion of a second graphical profile is considered, e.g., 20% thereof. Such a portion, itself, could correspond to a predetermined portion of the inner circumference of the measured tubular, over a given arc length, with respect to a predetermined reference point (such as that indicated at "R" in FIGS. 4A-4C). Thus, a relatively large number of candidate first graphical profiles in the store can also be considered with respect to the same limited portion, e.g., 20% of the profile with respect to the same or analogous reference point, and can be admitted to a subsequent step of the iterative matching process if they adequately match the second graphical profile within a predetermined threshold or set of thresholds established by the algorithm.

Then, in accordance with one or more embodiments, a relatively larger portion of the second graphical profile may be considered, e.g., 40% thereof, and comparisons made to the remaining candidate first graphical profiles with respect to the same or analogous portion of those profiles. Similarly to the initial iterative process step, any candidate first graphical profiles can be admitted a subsequent step of the iterative matching process if it adequately matches the second graphical profile within a predetermined threshold or set of thresholds established by the algorithm. This iterative process may then continue, e.g., into subsequent process steps where 60%, 80% then 100% of the second graphical profile is considered and compared to candidate first graphical profiles, which themselves are filtered out at each step until a single adequate match is determined. It can thus be appreciated that such a process can help economize on computing resources, while essentially any conceivable number of steps, or sequentially narrowing filters, can be applied as may be deemed suitable for the application at hand. Further, it can be appreciated that any of a great variety of suitable subroutines can be applied at each iterative step for the purpose of comparing graphical profiles and determining one or more candidates, within a predetermined threshold or set of thresholds, suitable for admission to the next iterative step.

In accordance with one or more embodiments, accommodations can made—or can be understood as being incorporated—in view of the possibility of changes to a tubular ID profile that may result from physical variations (e.g., temperature variations) during transport or storage. A margin of error could thus be applied to any measurements of ID taken subsequent to the first set of measurements described herein (e.g., the "second set of measurements" described herein). However, it should generally be understood that a sufficient number and magnitude of measurements taken should mitigate the possible effect of any such variations, especially in conjunction with an algorithm that is still able to determine an accurate match despite such variations.

By way of possible refinements, in accordance with one or more embodiments, profiles as described and illustrated herein (e.g., with respect to FIGS. 4A-C) could be linked to one or more computers, or intelligent machines, that can also retrieve information or data such as manufacturing specifications and other related documentation for the specific tubular in question. In the same vein, the tubular could be aligned or connected with one or more intelligent computerized systems involved in a drilling operation.

As an additional refinement, in accordance with one or more embodiments, for backup purposes, a graphical and/or numerical profile of a tubular may be stored in a non-transitory medium (e.g., a small RFID tag) that is affixed or adhered to the tubular in a predetermined location.

It can also be appreciated that numerous advantages may be found in accordance with one or more embodiments. For instance, by significantly enhancing material traceability in the context of a well site operation, especially via a process as quick and automatic as those broadly contemplated herein, the probability of error (e.g., using the wrong type of tubular in an operation) is greatly reduced. Further, accurate and efficient identification as broadly contemplated herein can significantly reduce the number of unused tubulars which may be wasted or discarded for lack of ready identification, or that may otherwise necessitate a lengthy and inefficient process of analysis and categorization. Generally, one or more embodiments as disclosed and illustrated herein can preserve and protect inventories while greatly reducing the likelihood of workover operations.

FIG. 6 schematically illustrates a computing device and related components, in accordance with one or more embodiments. As such, FIG. 6 generally depicts a block diagram of a computer system 802 used to provide computational functionalities associated with described algorithms, methods, functions, processes, flows, and procedures as described in this disclosure, according to one or more embodiments. In this respect, computer 802 may interface with one or more measurement tools 638 similar or analogous, e.g., to the measurement tool 238 described and illustrated with respect to FIGS. 3A and 3B, either directly (e.g., via hard-wired connection) or over an internal or external network 814. Further, a dedicated database for storing one or more profiles of one or more tubulars (such as the profiles 440 shown in FIGS. 4A-4C) may be housed in computer 802 (e.g., in memory 806), or may be housed or stored elsewhere in a manner to be controlled or communicated with by computer 802.

In accordance with one or more embodiments, the illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 802 may include a computer that includes an input device, such as a keypad, keyboard, touch screen, or other device that can accept user information, and an output device that conveys information associated with the operation of the computer 802, including digital data, visual, or audio information (or a combination of information), or a GUI.

The computer 802 can serve in a role as a client, network component, a server, a database or other persistency, or any other component (or a combination of roles) of a computer system for performing the subject matter described in the instant disclosure. The illustrated computer 802 is communicably coupled with a network 814. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, business intelligence (BI) server, or other server (or a combination of servers).

The computer 802 can receive requests over network 814 from a client application (for example, executing on another computer 802) and responding to the received requests by processing the said requests in an appropriate software application. In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, both hardware or software (or a combination of hardware and software), may interface with each other or the interface 804 (or a combination of both) over the system bus 803 using an application programming interface (API) 812 or a service layer 813 (or a combination of the API 812 and service layer 813. The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined business functionalities through a defined interface. For example, the interface may be software written in JAVA, C++, or other suitable language providing data in extensible markup language (XML) format or another suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 6, two or more interfaces 804 may be used according to particular needs, desires, or particular implementations of the computer 802. The interface 804 is used by the computer 802 for communicating with other systems in a distributed environment that are connected to the network 814. Generally, the interface 804 includes logic encoded in software or hardware (or a combination of software and hardware) and operable to communicate with the network 814. More specifically, the interface 804 may include software supporting one or more communication protocols associated with communications such that the network 814 or interface's hardware is operable to communicate physical signals within and outside of the illustrated computer 802.

The computer 802 includes at least one computer processor 805. Although illustrated as a single computer processor 805 in FIG. 6, two or more processors may be used according to particular needs, desires, or particular implementations of the computer 802. Generally, the computer processor 805 executes instructions and manipulates data to perform the operations of the computer 802 and any algorithms, methods, functions, processes, flows, and procedures as described in the instant disclosure.

The computer 802 also includes a memory 806 that holds data for the computer 802 or other components (or a combination of both) that can be connected to the network 814. For example, memory 806 can be a database storing data consistent with this disclosure. Although illustrated as a single memory 806 in FIG. 6, two or more memories may be used according to particular needs, desires, or particular implementations of the computer 802 and the described functionality. While memory 806 is illustrated as an integral component of the computer 802, in alternative implementations, memory 806 can be external to the computer 802.

The application 807 is an algorithmic software engine providing functionality according to particular needs, desires, or particular implementations of the computer 802, particularly with respect to functionality described in this disclosure. For example, application 807 can serve as one or more components, modules, applications, etc. Further, although illustrated as a single application 807, the application 807 may be implemented as multiple applications 807 on the computer 802. In addition, although illustrated as integral to the computer 802, in alternative implementations, the application 807 can be external to the computer 802.

There may be any number of computers 802 associated with, or external to, a computer system containing computer 802, wherein each computer 802 communicates over network 814. Further, the term "client," "user," and other appropriate terminology may be used interchangeably as appropriate without departing from the scope of this disclosure. Moreover, this disclosure contemplates that many users may use one computer 802, or that one user may use multiple computers 802.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method comprising:
measuring an inner diameter (ID) of a tubular at least at a plurality of points along an inner circumference of the tubular, at a predetermined axial distance from an end of the tubular, to yield a first set of measurements; and
using a computer processor to:
create a tubular profile from the first set of measurements, wherein the tubular profile represents a unique identification code of the tubular;
save the profile; and
thereafter identify the tubular via:
receiving a second set of measurements of the ID of the tubular from at least at a plurality of points along an inner circumference of the tubular, at the predetermined axial distance from the end of the tubular; and
comparing the second set of measurements with the saved tubular profile to identify the tubular.

2. The method according to claim 1, wherein creating the tubular profile comprises creating a plot of the first set of measurements against at least one benchmark.

3. The method according to claim 2, wherein the at least one benchmark includes one or more of: a predetermined minimum ID and a predetermined maximum ID.

4. The method according to claim 3, wherein the benchmarks of minimum ID and maximum ID are graphically represented by two concentric circles.

5. The method according to claim 4, wherein creating the plot comprises representing the plot as a varying solid area, between the two concentric circles, corresponding to the first set of measurements.

6. The method according to claim 1, wherein measuring to yield the first set of measurements comprises measuring the ID over a full inner circumference of the tubular as the tubular is rotated 360 degrees.

7. The method according to claim 6, wherein measuring the ID over the full inner circumference comprises measuring continuously over the full inner circumference.

8. The method according to claim 6, wherein comparing the second set of measurements with the saved tubular profile comprises determining a match between the second set of measurements and the saved tubular profile.

9. The method according to claim 1, wherein measuring to yield the first set of measurements comprises using a depth gauge instrument to measure the ID.

10. The method according to claim 1, further comprising measuring the ID of the tubular at least at a plurality of points along an inner circumference of the tubular, at the predetermined axial distance from an end of the tubular, to yield the second set of measurements.

11. The method according to claim 1, wherein creating the tubular profile comprises creating a first graphical profile.

12. The method according to claim 11, further comprising using the computer processor to:
create a second graphical profile from the second set of measurements;
wherein comparing the second set of measurements with the saved tubular profile comprises comparing the first graphical profile with the second graphical profile.

13. A system for identifying a tubular, the system comprising:
a first measurement tool configured to measure an inner diameter (ID) of a tubular at least at a plurality of points along an inner circumference of the tubular, at a predetermined axial distance from an end of the tubular, to yield a first set of measurements; and
one or more hardware processors in communication with the first measurement tool and configured to:
create a tubular profile from the first set of measurements, wherein the tubular profile represents a unique identification code of the tubular;
save the tubular profile; and
thereafter identify the tubular via:
receiving a second set of measurements of the ID of the tubular from at least at a plurality of points along an inner circumference of the tubular, at the predetermined axial distance from the end of the tubular; and
comparing the second set of measurements with the first set of measurements in the saved tubular profile to identify the tubular.

14. The system according to claim 13, wherein the one or more hardware processors are configured to create the tubular profile via creating a plot of the first set of measurements against at least one benchmark.

15. The system according to claim 14, wherein the at least one benchmark includes one or more of: a predetermined minimum ID and a predetermined maximum ID.

16. The system according to claim 15, wherein:
the benchmarks of minimum and maximum ID are graphically represented by two concentric circles, and
the one or more hardware processors are configured to create the plot via representing the plot as a varying solid area, between the two concentric circles, corresponding to the first set of measurements.

17. The system according to claim 13, wherein the one or more hardware processors are configured to measure to yield the first set of measurements via measuring the ID over a full inner circumference of the tubular.

18. The system according to claim 13, further comprising a second measurement tool arranged to measure an inner diameter (ID) of a tubular at least at a plurality of points along an inner circumference of the tubular, at a predetermined axial distance from an end of the tubular, to yield the second first set of measurements.

19. The system according to claim 18, wherein one or more of the first and second measurement tools comprises a depth gauge instrument.

20. A non-transitory computer readable medium storing instructions executable by a computer processor, the instructions comprising functionality for:
receiving a first set of measurements of an inner diameter (ID) of a tubular from at least at a plurality of points along an inner circumference of the tubular, at a predetermined axial distance from an end of the tubular;
creating a tubular profile from the first set of measurements, wherein the tubular profile represents a unique identification code of the tubular;
saving the tubular profile; and
thereafter identifying the tubular via:
receiving a second set of measurements of the ID of the tubular from at least at a plurality of points along an inner circumference of the tubular, at the predetermined axial distance from the end of the tubular; and
comparing the second set of measurements with the saved tubular profile to identify the tubular.

* * * * *